United States Patent [19]

Pook

[11] Patent Number: 4,608,109

[45] Date of Patent: * Aug. 26, 1986

[54] METHOD OF MANUFACTURING HIGH POTENTIAL ELECTRETS

[76] Inventor: H. Wilson Pook, 120 Widmore Road, Bromley, Kent, England

[*] Notice: The portion of the term of this patent subsequent to Apr. 3, 2001 has been disclaimed.

[21] Appl. No.: 583,600

[22] Filed: Feb. 27, 1984

Related U.S. Application Data

[63] Continuation-in-part of Ser. No. 379,648, May 19, 1982, Pat. No. 4,440,591.

[30] Foreign Application Priority Data

Mar. 7, 1983 [GB] United Kingdom ............... 8306215

[51] Int. Cl.[4] ...................... B32B 31/00; B32B 31/20
[52] U.S. Cl. ............................. 156/247; 29/592 E;
  156/249; 156/254; 156/273.1; 156/292;
  156/306.6; 156/309.6; 156/311; 156/344;
  248/1; 248/359; 264/248; 307/400; 428/76;
  428/212; 428/900
[58] Field of Search ............... 156/70, 306.6, 213,
  156/309.6, 247, 311, 249, 313, 254, 344, 292,
  273.1; 428/76, 900, 212; 264/248; 248/1, 359 R;
  29/592 E; 307/400

[56] References Cited

U.S. PATENT DOCUMENTS 4,275,112 6/1981 Savage .............................. 307/400
4,440,591 4/1984 Pook ............................. 156/309.6

FOREIGN PATENT DOCUMENTS 57-14289 1/1982 Japan ............................. 29/592 E Primary Examiner—John J. Gallagher
Attorney, Agent, or Firm—I. Michael Bak-Boychuk

[57] ABSTRACT

A method for producing stable, layered electrets includes the steps of placing a thin sheet of glassy polymer or copolymer of high molecular weight, such as polyethylene terephthalate, between two, somewhat larger in planform, sheets of polyvinyl chloride and/or polyvinyl acetate formulation, to form a sandwich structure which is then compressed and heated to approximately 300° F. At this temperature the exterior polyvinyl chloride or copolymer sheets are polarized and displaced under pressure over the interior sheet to charge the interfaces of the exterior and interior sheets. The heat, furthermore, bonds the peripheral edges of the larger exterior sheets to each other thus forming a hermetically closed container within which the charged interfaces will reside. Alternatively, two or more sheets of electret (polymer) material may be pressed and heated against each other to a point where plastic deformation occurs but below melting. At this point surface charges on each sheet induce internal charges or polarization which is then fixed by rapid cooling.

5 Claims, 8 Drawing Figures

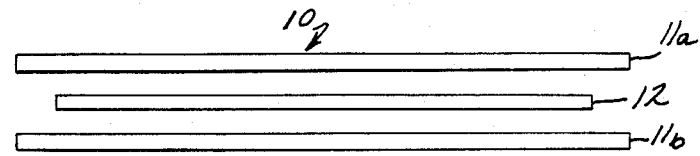
FIG. 1
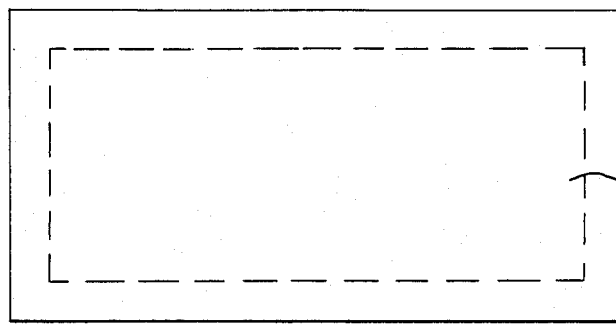
FIG. 2
FIG. 3
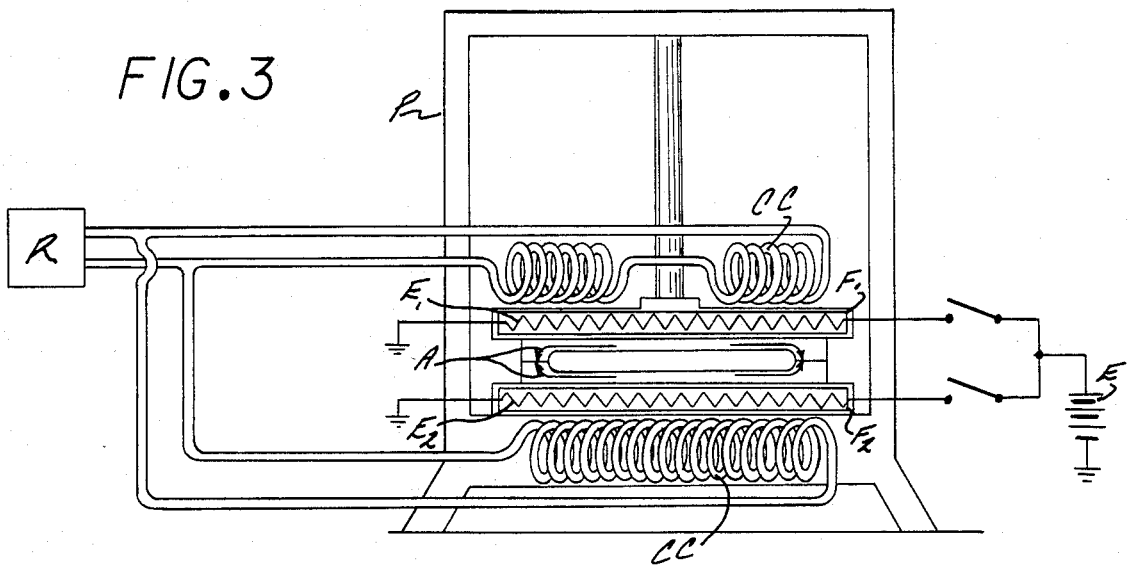
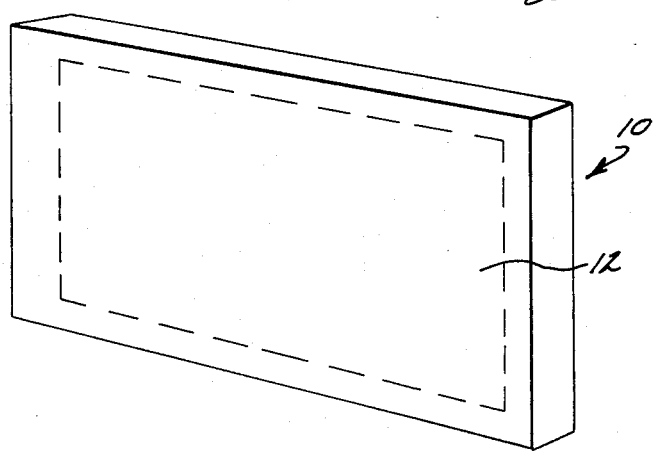
FIG. 4

METHOD OF MANUFACTURING HIGH POTENTIAL ELECTRETS

This is a continuation in part of application Ser. No. 379,648, filed May 19, 1982, now issued as U.S. Pat. No. 4,440,591, on Apr. 3, 1984.

BACKGROUND OF THE INVENTION

1. Field of the Invention

The present invention relates to electrets, and more particularly, to layered electrets retaining a high surface potential.

2. Claim for Right of Priority

I hereby claim my right to the filing date of my corresponding application filed in the United Kingdom on Mar. 7, 1983 entitled "Electrets and The Manufacture Thereof" under the filing number 8306215 published Mar. 7, 1983 as Patent No. 2136207 which, in turn, is a Continuation-In-Part of United Kingdom patent application number 8115402 filed May 20, 1981 entitled "A Method of Manufacturing An Electret Assembly."

DESCRIPTION OF THE PRIOR ART

An electret is a known device comprising a body of dielectric material within which electric polarization is established to create a persistent electrostatic field. Such electrets can be employed in instances where charged dielectric or electrostatic fields are required without the employment of a dynamic generating system. In particular, charged surfaces are of use as an alternative to magnetic attachment, for example, serving the use of bulletin boards or other display functions. Furthermore, charged surfaces may be used in filtering systems to collect airborne dust and in many other applications.

In the past the knowledge that certain dielectric materials may be electrostatically polarized has been well developed. Furthermore, techniques for polarized dielectric materials are known and, for example, stable synthetic materials such as polymethylmethachrylate, polystyrene, polythene, polyethylene terephthalate or polymers of vinyl chloride or vinyl acetate or copolymers or combinations thereof, have had extensive success in forming stable electrets.

Typically, such materials were polarized through the following steps:

1. By raising the temperature of the material to an excitation temperature known as the "polarizing temperature."
2. By applying an electric field to produce a polarizing charge.
3. By allowing the material to cool in the presence of the electric field to thus fix the charge.

In each instance the foregoing technique results in an electrically polarized structure known as an "electret," which functionally and theoretically may be considered as the electrical equivalent of a permanent magnet.

These past developments in this art were primarily directed to improvements in the formulation in the materials and methods of manufacturing same with one common feature: most, if not all the prior art techniques utilize an externally impressed electric field in order to produce the polarized charge. Thus, the prior art is replete with structures wherein electrical charges are produced by clamping the dielectric material between conducting surfaces and impressing thereon a high potential source of direct current, as for example, that disclosed in U.S. Pat. Nos. 3,660,736 and 3,949,178, or by bombardment of the surface of the dielectric material with an electron beam or irradiation from a radioactive source of energe (see, for example, U.S. Pat. No. 3,930,066). In addition the literature containing references to electrets can be found in the following: "The Theory of Electric Polarization," Volume 2, C. J. F. Boettcher; "Contact and Frictional Electrification", W. R. Harper, 1967, Oxford University Press; "Static Electrification" by Loeb, Germany, 1958; and "Electrostatics and Its Application," A. D. Moore, 1973, John Wiley, Inc., U.S.A.

While the foregoing prior art techniques are suitable for their intended purpose, they all suffer from the limitation inherent in charging thick films. In particular, it has been found that the charging voltage necessary to polarize thick films is of sufficient intensity to destroy the material itself. Thin films, on the other hand, suffer deterioration due to ohmic leakage and absorption of ions from the surface with the resulting reorientations of the dipole. Furthermore, in order to produce an electret having a long life one must seek a large overall volume resistivity. If the resistance is small the charge will disappear in a short time.

Thus techniques by which charge may be impressed on thick film, without the necessary high charging voltages, is sought in the art. It is such a technique that is described herein.

SUMMARY OF THE INVENTION

Accordingly, it is the general purpose and object of the present invention to provide a technique by which dielectric structures may be electrically polarized in the absence of high charging potentials.

Other objects of the invention are to provide a technique for polarizing dielectrics which concurrently encapsulates the polarized surface against discharge or leakage.

Yet additional objects of the invention are to provide a technique for forming charged surfaces in a convenient and inexpensive manner.

Briefly, these and other objects are accomplished within the present invention by sandwiching a base sheet or layer of dielectric material characterized as a non-brittle glassy polymer or copolymer of high molecular weight and exemplified by material structures such as polyethylene terephthalate (PET), between two pieces or sheets of polyvinyl chloride and/or polyvinyl acetate having a plan form somewhat greater than the base sheet. The base sheet or the sheet of the PET material, is placed centrally on one of the larger exterior sheets and the second exterior sheet is placed on top to form a sandwich bounded by the extending edges of the exterior sheets. This sandwich assembly is then placed between the faces of a press which is closed onto the assembly to develop a high pressure, which at the same time includes heating means in the pressure faces to raise the temperature of the faces until sufficient heat is passed to heat the sandwich assembly to approximately 300° F. This temperature is maintained in the course of applying pressure, developing sufficient sandwich temperature for polarization to occur and to allow the outer edges of the exterior sheet to fuse together. At that point the heat source is disconnected and the sandwich is permitted to cool while still compressed. After cooling the assembly is removed from the press having acquired substantial electrostatic charge which manifests itself with the appearance of negative charges on the two outer faces.

It is believed that the foregoing method takes benefit of the electrical effect of contact charging and friction, generally known as "triboelectrification." The observable effects of this phenomenon have been seen by all in the course of separating dry fabrics or by the visible arcing between surfaces that are pulled apart. While the exact features of this phenomenon are not fully understood it is commonly agreed that such charging can and does occur in some degree when almost any two surfaces are brought into contact. The foregoing effect is most pronounced and substantial when flat surfaces of insulating material are brought into contact. It has been claimed that contact is, in fact, friction and friction certainly must imply contact with translation in the lateral plane. Although the mechanism is not fully understood it has been established as an indisputable fact that where such a contact between two surfaces occurs a charge transfer between the surfaces at the point of contact is always present. When such contact occurs in the presence of friction then a very heavy degree of charging can result. (See reference literature: "The Theory of Electric Polarization," Vol. 2, C. J. F. Boettcher; "Contact and Frictional Electrification," W. R. Harper (1967) Oxford University Press; "Static Electrification" by Loeb, Germany 1958; "Electrostatics and Its Application", A. D. Moore, (1973) John Wiley, Inc. U.S.A.). The above-mentioned sources of electrification are known collectively as "Triboelectrification" and it is this phenomena which is employed in this present invention. (see W. R. Harper and A. D. Moore as above.)

Thus, a sequence of events which occurs during the inventive process is as follows:

1. Contact is made between the inner faces of the assembly, thereby initiating an electrical charge at the initial points of contact.
2. As the pressure develops the faces are brought into closer contact with a further development of electrical charge. Simultaneously, the air between the faces of the inner sides of the element is being excluded and exuded at the outer edges of the assembly, permitting a progressively greater degree of contact between the faces.
3. The exclusion of all air from between the faces is followed by the yielding, through heat, of the exterior sheets. Since the softening point of PET is higher than that of the copolymer exterior sheets, the copolymer sheets will be displaced under pressure to flow in a lateral plane so that the faces of the two exterior sheets will in effect migrate over the face of the still rigid PET interior sheet.
4. This lateral movement creates friction which is known to have a maximum effect when the rubbing surfaces are in true or near true contact.
5. The softened exterior surfaces, furthermore, also act to enclose any particulate debris that is always found in any commercial process which, under pressure, will bring about the deformation to allow the completion of the intimate contact between the faces. It has also been found that the rupturing of the polymer faces by such particulate matter will contribute further to the generation of charge.
6. Simultaneously the temperature of the elements or of the sheets is being raised to the temperature at which the polymers are polarized in the presence of the tribolelectrical forces now developed.
7. Concurrently the two outer edges of the exterior sheets are fused together so that a hermetic container is formed sealing off the charged interfaces from outside atmosphere.
8. While still applying pressure the heat source may then be disconnected to begin a cooling cycle while the fused edges are still compressed.
9. At the completion of the above process the assembly is removed from the press. The three sheets are still firmly in contact due to the following effects:
   (a) the electrostatic force developed between the interfaces in accordance with Coulombic law, due to the opposite polarities in contact; and
   (b) the negative atmosphere developed as result of the evacuation of air from between the interfaces.

Once removed from the press the assembly is found to be carrying strong negative charges which exhibit charge potentials in order ot 6000 volts per centimeter. Thus, as is set out, only simple mechanical operations are involved in the production of a charged electret of high potential and stability.

In addition to the foregoing steps either or both sheets, if desired, may be preconditioned as to be initially polar positive or polar negative before assembly, by the introduction of an electron donor or electron acceptor impurities in the polymers.

The interfaces of the electret sheets may also, if desired, be preconditioned by suitable surface treatment comprising, amongst other means, the application of a surface coating or by subjection to a corona discharge or irradiation from a radioactive source. This center electret sheet may also, if required, be preconditioned for increased slip coefficients or friction by abrading one or both surfaces thereof or by deposition thereon of lacquers containing micronic sized particles or abrasive.

In an alternative method two or more sheets of dielectric material may be brought into intimate contact within a press, and heated until plastic flow begins to occur. At this point surface charges on each sheet will impress a charge onto the now mobile interior molecules or chains thereof, aligning the molecular dipoles in accordance with the charge. The films or sheets are then rapidly cooled while still in the press to fix the polarized molecular alignment.

The films for this purpose may be selected from materials like polymethylmethacrylate, polysterene, polyethylene terephthalate, polycarbonate polyethylene polytetrafluorethylene and polyvinylchloride which each possess varying charge strength and polarity. These may be advantageously arranged in triboelectric series wherein a strongly negative polymer like PVC is interleaved with neutral sheets like polyester which are then charged in accordance with the layer structure. These preferred films or sheets result in a high performance PVC electret and a low performance polyester sheet upon cooling, with mass production economies being realized through the use of multiple layer stacking.

The high performance electrets thus produced can then be conformed into what is referred to as, close circuit electrets, open circuit electrets or electrets having only one side open. More specifically, a closed circuit electret is formed herein by encapsulation of the PVC or other high performance electret sheet in a dielectric cover where compensating charges then form on the cover surfaces. These compensating charges or fields then act as a barrier across the field or charge in the internal electret. This barrier effect may be controlled by the cover material selection to produce the foregoing one side open or open circuit electrets.

Additionally, the foregoing electrets may be shielded or screened on one side by conductive exterior layers like metal foil or by treatment with the antistatic agents commonly available.

BRIEF DESCRIPTION OF THE DRAWINGS

FIG. 1 is a side view, separated by parts, of a trilaminate electret assembly constructed according to the invention herein;

FIG. 2 is a plan view of the assembly shown in FIG. 1;

FIG. 3 is yet another side view of the electret assembly shown in FIG. 1, illustrated in place in the apparatus used to form same;

FIG. 4 is a perspective view of the electret assembly constructed according to the invention herein;

DESCRIPTION OF THE SPECIFIC EMBODIMENT

Figure 5:
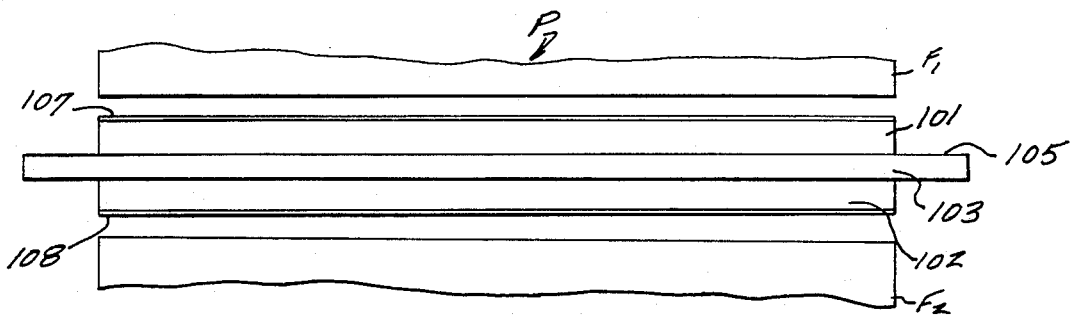
FIG. 5 is yet another illustration, in side view, of an alternative fabrication process of electret surfaces disclosed herein.

As shown in FIGS. 1–4, a trilaminate electret assembly, generally designated by the numeral 10, comprises an upper and a lower outer sheet 11a and 11b, respectively, of a thickness ranging between 100–800 microns and of a material structure formulated as a copolymer, or polyvinyl chloride together with polyvinyl acetate, in proportions of 86% polyvinyl chloride polymer and 14% polyvinyl acetate polymer, by weight. The foregoing composition of the outer sheet may be further modified by inclusion of plasticizers and lubricants of known characteristics and also such impact modifiers as may be necessary to adapt the end use thereof, the lubricants and modifier being added to the composition together with the above-mentioned mix of PVC and polyvinyl acetate. Between these outer sheets 11a and 11b there is placed a sheet 12 of polyethylene terephthalate of a thickness ranging between 12–75 microns and having a plan form smaller than the planform of sheets 11a and 11b. This sheet 12 is laid in the center of one of the outer sheets 11a or 11b such that a peripheral edge strip 16 is formed across which the other outer sheet may be joined. This peripheral strip or margin 16 thus provides the means by which the two exterior sheets may hermetically encase the interior sheet 12 according to the method following.

More specifically, the trilaminate assembly comprising sheets 11a, 11b and sheet 12 placed therebetween, is arranged between the faces F1 and F2 of a press P, and once thus placed the press is closed onto the assembly to a pressure of approximately 6000 pounds per square inch. Faces F1 and F2 may futhermore include resistive or other heating elements E1 and E2, respectively, by which the temperature between the faces may be raised until polymer sheets 11a, 11b and 12 attain a temperature of the order of 300° F. The source of heat may be any conventional electric source E and may be switched off upon the reaching of the foregoing temperature, allowing the whole trilaminate assembly to cool within the confines of the press. Once cooled, the trilaminate assembly 10 may then be removed from the press, having now become an electret. As shown more specifically in FIG. 3, during the course of heating, sheets 11a and 11b become fused along the peripheral margin 16 fully enclosing the center or internal sheet 12 against leakage or atmospheric contamination. This fusion process occurs as result of the heat applied through heating elements E1 and E2 while compressed, resulting in a lateral migration of the polymer material shown by arrows A. This lateral migration of the exterior sheets 11a and 11b induces the necessary contact at friction over the center sheet 12 to develop the necessary tribolelectric charge which then is permanently fixed once the edges are fused.

Deviations from the above-described and preferred embodiment are conceivable and may be carried out within the scope of the invention. For example, electret sheets 11a, 11b and 12 are not necessarily limited to the stated polymers as any suitable material may be used that obeys the essential requirements of this invention. Also, it may be desirable to include within this sequence the step of charging the sheets as they lie within the press by way of any impressed electric force. Furthermore, the electret sheets may be of any desired thickness or color and one or more of the sheets may have a conductive coating applied to all or parts of its surface.

Electrets made according to this invention may taken on any form, there being no substantial limitation other than the limitation of the press P. Furthermore, electrets made according to this invention may be combined to form various assemblies such as an annularly shaped assembly to produce a cylinder with open ends wherein a concentrated field will be established or similar arrangements. In addition, electrets made according to this method may include plural polar layers, or other structural configurations which is compatible with the tribolelectric charging method set out herein.

Figure 8:
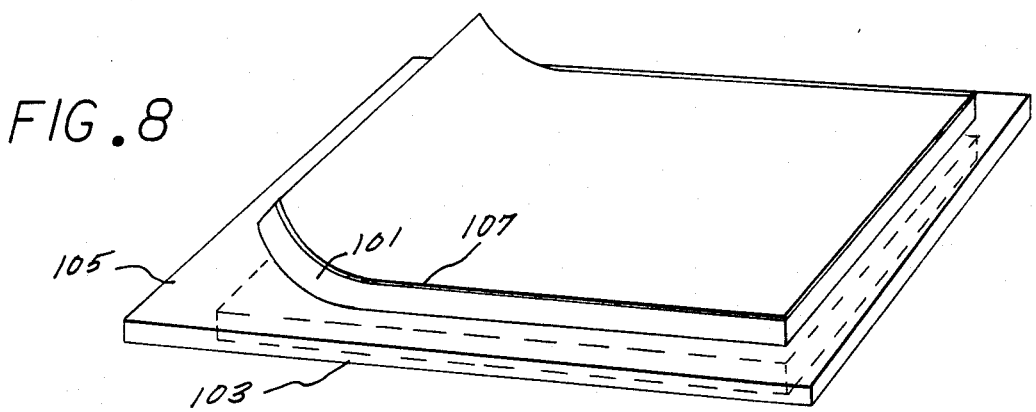
FIG. 8 is a perspective illustration illustrating the separation process useful herein.

A further alternative to the foregoing invention is shown in FIGS. 5 and 8. As shown in these figures, two PVC sheets 101 and 102, preferably 150 to 250 microns in thickness, may be placed on either side of a larger center sheet 103 of polyester terephthalate, sheet 103 being preferrably 23 to 75 microns thick. The larger planform of sheet 103 provides for a projecting margin 105 around all the edges of this sandwiched construction, thus separating sheets 101 and 102. In this form the sandwich may be pressed and heated in the press P, in accordance with the teachings set out hereinabove, to the temperature of glass transition with the face pressure maintained at about 175 Kg/cm$^2$. The heat application may be maintained for a period of 12 to 15 minutes followed by a quick cooling cycle by way of cooling conduits CC connected to a refrigeration source R, for a period of two to three minutes. The press may then be relieved and the sandwich is remoed therefrom following which the exterior surfaces of the sandwich are covered with a conductive shield 107 and 108 of metal foil or thin films of polyester or polycarbonate rendered conductive by a coating of long chain ethylene oxide condensate. Having thus treated the sandwich the shielded outer sheets 101 and 102 may then be stripped off the larger polyester center sheet 103 which is either discarded or retained as a low performance electret. The treated high performance PVC electrets 101 and 102 then remaining may be variously mounted for use as display or pinning boards according to the description following. In this use the electrets stabilize at a charge of about 5000 volts/cm (having initial charge levels of about 6000 volts/cm which by breakdown and discharge decay down to the foregoing stabilized charge levels.)

Figure 6:
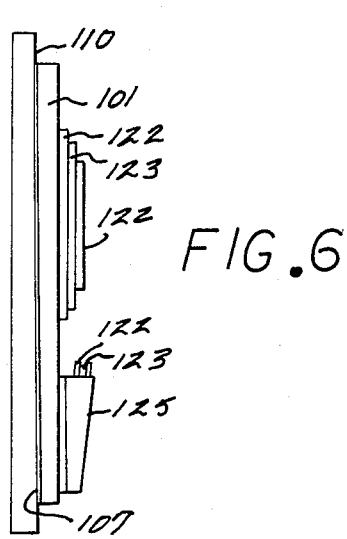
FIG. 6 is a side view of an electret display board in accordance with an alternative implementation set out herein.

As shown in FIG. 6 the electret sheet 101 backed with the conductive layer 107 may be adhesively bonded to a rigid board 110 to thus form a display board or pinning surface which may be conveniently mounted on a wall or otherwise.

When thus used as a display board, the front or unshielded face of the electret panel 101 (or 102) will produce a negative electrostatic field adjacent to its surface. The atmosphere, containing both positive and negative ions, will then compensate this field reducing its apparent effectiveness. This compensating charge, however, will be conveniently grounded by the limbs of the person of the user to reveal the full charge fixed in the body of the electret.

Thus, a negatively charged surface of sheet 101 is provided onto which positively charged display elements 122 may be placed. These display elements 122 may be neutral or more preferrably naturally positive polar sheets, such as paper or polyester sheets, which will conveniently be induced to a positive charge. These positively charged display elements 122 will then adhere, with some force, to the surface of electret 101 and once thus attracted thereto may be translated or slid for alignment. Moreover, additional overlaying elements 123 of neutral or negative polarity may be placed thereover to be alternated further with additional positive polarity elements 122 as desired. Elements 122 and 123 may be stored in a pouch 125 formed along the lower edge of the backing board 110 and the material selection for the board 110, the electret 101 and the elements 122 and 123 may be transparent, translucent or opaque according to the choice of display or presentation selected.

Figure 7:
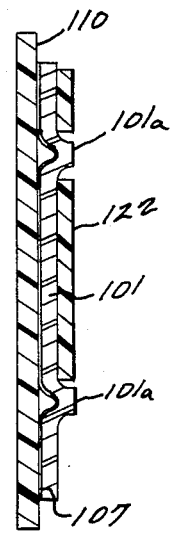
FIG. 7 is yet another side view illustrating an alignment detail useful herein.

Additionally, electrets 101 and 102 may include scribes or alignment embossings shon as cavities 101a in FIG. 7 which may be used for alignment of the display elements 122, which may be formed in the course of pressing or subsequent to the separation of the electret sandwich.

One should note that the foregoing process may entail sandwich layers of plural interleaving and more than two electrets may be achieved in each heating and cooling cycle of the press P. Simply, the number of layers in the sandwich is dominantly dependent on the heat transfer rates of the press, the sheet thickness selected and the extent of control over the sheet temperature, all matters known to those skilled in the art. Moreover, the number of layers of display elements which can be placed on a display board is a matter of design choice being mostly determined by the selection of the material, thickness, and surface conditions.

As used herein, the term "glass transition" is intended to connote material temperatures at which softening begins but at which the material is below its melting temperature; the ferm "pinning" refers to the electrostatic detachable retention of the elements on the surface of the electret, and the term "charge" is used to provide the indirect measure of charge density ($nC/CM^2$) as reflected by way of the potential (Volts) at a given distance from the surface.

The typical prior art charge levels by way of DC charging, corona discharge or charge injection techniques are exemplified in U.S. Pat. Nos. 3,458,713; 3,660,736; 3,755,043; 3,949,178; and 3,967,027. More recently, a technique for polarizing a dielectric by way of stressing and heat has been disclosed in a United Kingdom Patent Specification No. 2,050,058. Other general publications like "Topic in Applied Physics—Electret" Springer Verlog 1980 and the papers "Electrostatics" in British Instute of Physics Conference, Series 48, 1979. All the foregoing references disclose maximum charge voltages of 0–2000 Volts, voltages substantially less then the 5000–6000 Volts/CM achievable herein.

Obviously many modifications and changes may be made to the foregoing description without departing from the spirit of the invention. It is therefore intended that the scope of the invention be determined solely on the claims appended hereto.

What is claimed is:

1. A process for forming electrets comprising the steps of:
    forming a stack of sheets of a first dielectric material interleaved between sheets of a second dielectric material;
    pressing said stack between the faces of a press;
    heating during said pressing said faces of said press and said sheets of said second dielectric material to the glass transition thereof whereby said heating and pressing causes plastic flow of said sheets of said second dielectric material relative to said sheets of said first dielectric material to produce electrical charges thereon;
    cooling said sheets of material subsequent to the heating thereof; and
    stripping off said sheets of said second dielectric material from said sheets of said first dielectric material.

2. The method according to claim 1 wherein: said sheets of said first dielectric material are of a planform larger than said sheets of said second dielectric material.

3. The method according to claim 2 wherein: said step of pressing includes face pressures greater than 175 $Kg/CM^2$.

4. The method according to claim 3 wherein:
    said step of heating is maintained for a period of twelve to fifteen minutes; and
    said step of cooling is maintained for a period of two to three minutes.

5. A method according to claim 1 further comprising the step of:
    coating one side of said sheets of said first dielectric material with an electrically conductive coat.

* * * * *